United States Patent Office 3,379,498
Patented Apr. 23, 1968

3,379,498
RECOVERY OF POTASSIUM FROM PHOSPHATES
Maria G. Dunseth, Phoenix, and Murrell L. Salutsky, Silver Spring, Md., assignors, by direct and mesne assignments, of one-half to W. R. Grace & Co., New York, N.Y., and one-half to the United States of America as represented by the Secretary of the Interior
No Drawing. Filed Apr. 19, 1965, Ser. No. 449,342
4 Claims. (Cl. 23—107)

ABSTRACT OF THE DISCLOSURE

Potassium is separated from magnesium potassium phosphate by digesting a slurry of the magnesium potassium phosphate in hot water whereby a potassium phosphate solution is formed.

---

The invention herein described and claimed may be manufactured and used by or for the Government of the United States of America for governmental purposes without the payment of royalties thereon or therefor.

This invention relates to recovery of potassium from phosphates precipitated from brines such as sea water, and resulted from work done under Contract 14–01–0001–281 with the Office of Saline Water of the Department of the Interior, entered into pursuant to the Saline Water Act, 42 U.S.C. 1951–1958g.

Numerous salt water brines, such as sea water, contain substantial amounts of various valuable elements such as potassium, calcium, magnesium, etc. As the available supply of these chemicals from other sources dwindles or becomes more expensive, interest in the use of brines as raw material sources has increased. Potash, in particular, is widely used in the chemical industry for production of many chemicals, particularly fertilizers. Recovery of potassium from sea water would represent a valuable additional source of this chemical.

Treatment of brines to remove magnesium and calcium and precipitate potassium as essentially magnesium potassium phosphate is disclosed in the copending U.S. application of Dunseth and Salutsky, Ser. No. 152,168, now Patent No. 3,195,978, filed Nov. 14, 1961. The precipitate thus obtained is a mixture consisting essentially of $MgKPO_4$ and varying amounts of calcium and sodium phosphates. Proportions of calcium in the precipitate will usually vary from about 5% to 10% while that of sodium is usually from about 5% to 7%.

Ser. No. 152,168 further discloses treatment of the magnesium potassium phosphate precipitate with an aqueous solution of an ammonium salt to form a solution of the corresponding potassium salt. This aqueous solution of the potassium salt may then be used in production of other potassium chemicals and is of particular value in manufacture of fertilizers.

It has now been found, however, that the potassium may be liberated from the magnesium potassium phosphate-containing precipitate essentially as an aqueous solution of potassium phosphate by digesting a slurry of the precipitate in hot water. This method is both simple and efficient in separating the potassium from other metals. Digestion temperature may range from about 60° C. to 90° C., with percent solids content of the slurry ranging from about 5% to 15%. Digestion time may vary from about 5 minutes to 60 minutes; however, it has been found that the reaction is generally quite rapid and that a digestion time of only about 5 minutes is usually sufficient to remove a large percentage of the potassium.

The process of the invention is more specifically illustrated by the following example.

Example 1

Slurries of $KMgPO_4$-containing precipitate (3.04% $K_2O$) containing various percentages (5, 10 or 15%) of solids in distilled water were digested at 60° C., 90° C. or 100° C. for three hours, filtered and dried. The dried filter cakes were then analyzed for $K_2O$. The percent of residual $K_2O$ in the filter cake, as compared to the original $KMgPO_4$-containing precipitate, is given in Table 1. As seen in the table, more of the potassium is liberated by digestion at higher temperatures. However, at both 60° C. and 90° C. the percentage of $K_2O$ remaining in the cake increases with increasing solid content in the slurries, i.e., recovery of potassium from concentrated slurries is less favorable than from dilute slurries.

The data of the table also show that only negligible amounts of magnesium and calcium are extracted from the phosphate precipitate by digestion with hot water.

TABLE 1

|  | 60° C. | | | 90° C. | | | 100° C. |
|---|---|---|---|---|---|---|---|
|  | 5% solids | 10% solids | 15% solids | 5% solids | 10% solids | 15% solids | 10% solids |
| Percent residual $K_2O$ in filter cake | 57 | 81 | 77 | 36 | 59 | 72 | 19.57 |
| Percent residual MgO in filter cake | 98 | 98 | 98 | 99 | 99 | 99 | 98.78 |
| Filtrate Analysis: | | | | | | | |
| K, p.p.m | 883 | 929 | 1,839 | 1,157 | 2,199 | 2,726 | -------- |
| Ca. p.p.m | <4 | <4 | <4 | <4 | <4 | <4 | -------- |
| Mg. p.p.m | 3 | 4 | 5 | 1 | 2 | 3 | -------- |

What is claimed is:
1. A method of recovering potassium phosphate from magnesium potassium phosphate by digesting an aqueous slurry of magnesium potassium phosphate at a temperature of from about 60° C. to about 100° C. whereby said potassium phosphate goes into solution as a water soluble salt and separating said solution.

2. The method of claim 1 in which calcium and sodium phosphates in addition to magnesium potassium phosphate are present in said slurry.

3. The method of claim 1 in which the percent solids in the aqueous slurry is from about 5 to 15.

4. The method of claim 1 in which the percent solids in the aqueous slurry is from about 5 to 15 percent, and the temperature of digestion is from about 60° to 100° C.

References Cited

UNITED STATES PATENTS 2,824,785   2/1958   Merlut-Sobel  23—107

OTHER REFERENCES

Meller; Comprehensive Treatise on Inorganic and Theoretical Chemistry, vol. II, Supp. III, K, Rb, Cs, Fr, Wiley, New York, 1963, page 1958.

OSCAR R. VERTIZ, *Primary Examiner.*

L. A. MARSH, *Assistant Examiner.*